United States Patent
Yanagawa (10) Patent No.: US 8,422,106 B2
(45) Date of Patent: Apr. 16, 2013

(54) IMAGE FORMING DEVICE (75) Inventor: Ryo Yanagawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 839 days.

(21) Appl. No.: 12/562,304

(22) Filed: Sep. 18, 2009

(65) Prior Publication Data
US 2010/0067062 A1    Mar. 18, 2010

(30) Foreign Application Priority Data

Sep. 18, 2008  (JP) .................................. 2008-238919

(51) Int. Cl.
G03F 3/10    (2006.01)
H04N 1/46    (2006.01)

(52) U.S. Cl.
USPC ............ 358/537; 358/1.1; 358/1.9; 358/1.18; 358/3.26; 358/517; 358/518; 358/527; 715/273; 715/274; 715/821; 715/822

(58) Field of Classification Search ............... 358/1.9, 358/518–523, 527, 537; 715/273–274, 821–824
See application file for complete search history.

(56) References Cited

U.S. PATENT DOCUMENTS

| | | | | |
|---|---|---|---|---|
| 4,656,524 A | * | 4/1987 | Norris et al. ................... | 358/401 |
| 5,204,947 A | * | 4/1993 | Bernstein et al. ............. | 715/854 |
| 5,511,148 A | * | 4/1996 | Wellner ........................ | 358/1.6 |
| 6,184,860 B1 | * | 2/2001 | Yamakawa .................... | 715/823 |
| 6,704,467 B2 | * | 3/2004 | Uchida ......................... | 382/311 |
| 6,847,377 B2 | * | 1/2005 | Kitahara et al. .............. | 345/600 |
| 7,069,506 B2 | * | 6/2006 | Rosenholtz et al. .......... | 715/273 |
| 7,337,396 B2 | * | 2/2008 | Rosenholtz et al. .......... | 715/273 |
| 7,432,939 B1 | * | 10/2008 | Platzer et al. ................ | 345/619 |
| 7,630,541 B2 | * | 12/2009 | Zitnick, III ................... | 382/162 |

(Continued)

FOREIGN PATENT DOCUMENTS

JP    2008-131499    6/2008

Primary Examiner — Richard Zhu
(74) Attorney, Agent, or Firm — Scully, Scott, Murphy & Presser PC (57) ABSTRACT

An image forming device includes a display unit, an original image display unit, a touch panel, a detecting unit, a selected region determining unit, an image forming unit, and a control unit. The display unit includes a display region. The original image display unit displays an original display image in the display region based on original image data. The touch panel is superposed on the display region. The touch panel enables a user of the image forming device to specify a prescribed position on the touch panel. The detecting unit detects a prescribed position touched by the user and generates position data based on the prescribed position. The selected region determining unit determines, based on the position data, a selected region in the original display image when the original image display unit displays the original display image in the display region. The image forming unit forms an image on a recording medium. The control unit controls the image forming unit to form a partially enhancement image on the recording medium based on the original image data. The partially enhancement image includes an enhancement part and a non-enhancement part, the enhancement part corresponding to the selected region, the non-enhancement part corresponding to a non-selected region that is outside of the selected region in the original display image.

13 Claims, 5 Drawing Sheets

U.S. PATENT DOCUMENTS

| | | | |
|---|---|---|---|
| 8,139,257 B2* | 3/2012 | Fabrice | 358/1.18 |
| 2006/0115185 A1* | 6/2006 | Iida et al. | 382/305 |
| 2007/0070473 A1* | 3/2007 | Lu et al. | 358/537 |
| 2007/0133074 A1* | 6/2007 | Fabrice | 358/537 |
| 2008/0151314 A1 | 6/2008 | Nishiie | |
| 2008/0309643 A1* | 12/2008 | Arimoto | 345/173 |
| 2010/0067062 A1* | 3/2010 | Yanagawa | 358/3.27 |

* cited by examiner

NORMAL COPY IMAGE 61

PARTIALLY ENHANCEMENT COPY IMAGE 62

IMAGE FORMING DEVICE

CROSS REFERENCE TO RELATED APPLICATION

This application claims priority from Japanese Patent Application No. 2008-238919 filed Sep. 18, 2008. The entire content of this priority application is incorporated herein by reference.

TECHNICAL FIELD

The present invention relates to an image forming device.

BACKGROUND

Image-forming devices that allow the user to freely set printing densities are well known in the art. For example, one such image-forming device executes a process to calibrate pixel densities in image data when the user presses a print density calibration button, allowing the user to form images with desired densities.

SUMMARY

However, if the user wishes to perform a process to increase the density in only a specific region of an image (i.e., a process to highlight a specific region), conventional stand-alone image-forming devices not equipped with an image processor cannot easily perform such a highlighting process.

In view of the foregoing, it is an object of the invention to provide an image-forming device that, through a simple user operation, can form an image in which user-specified regions are highlighted.

In order to attain the above and other objects, the invention provides an image foaling device including a display unit, an original image display unit, a touch panel, a detecting unit, a selected region determining unit, an image forming unit, and a control unit. The display unit includes a display region. The original image display unit displays an original display image in the display region based on original image data. The touch panel is superposed on the display region. The touch panel enables a user of the image forming device to specify a prescribed position on the touch panel. The detecting unit detects a prescribed position touched by the user and generates position data based on the prescribed position. The selected region determining unit determines, based on the position data, a selected region in the original display image when the original image display unit displays the original display image in the display region. The image forming unit forms an image on a recording medium. The control unit controls the image forming unit to form a partially enhancement image on the recording medium based on the original image data. The partially enhancement image includes an enhancement part and a non-enhancement part, the enhancement part corresponding to the selected region, the non-enhancement part corresponding to a non-selected region that is outside of the selected region in the original display image.

According to another aspect, the present invention provides a method executed by an image forming device, the method comprising: displaying an original display image in a display region based on original image data; enabling a user of the image forming device to specify a prescribed position on a touch panel; detecting a prescribed position touched by the user; generating position data based on the prescribed position; determining, based on the position data, a selected region in the original display image; and controlling an image forming unit to form a partially enhancement image on a recording medium based on the original image data, the partially enhancement image including an enhancement part and a non-enhancement part, the enhancement part corresponding to the selected region, the non-enhancement part corresponding to a non-selected region that is outside of the selected region in the original display image.

According to another aspect, the present invention provides a computer-readable recording medium that stores an image forming program, the image forming program comprising instructions for: displaying an original display image in a display region based on original image data; enabling a user of the image forming device to specify a prescribed position on a touch panel; detecting a prescribed position touched by the user; generating position data based on the prescribed position; determining, based on the position data, a selected region in the original display image; and controlling an image forming unit to form a partially enhancement image on a recording medium based on the original image data, the partially enhancement image including an enhancement part and a non-enhancement part, the enhancement part corresponding to the selected region, the non-enhancement part corresponding to a non-selected region that is outside of the selected region in the original display image.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
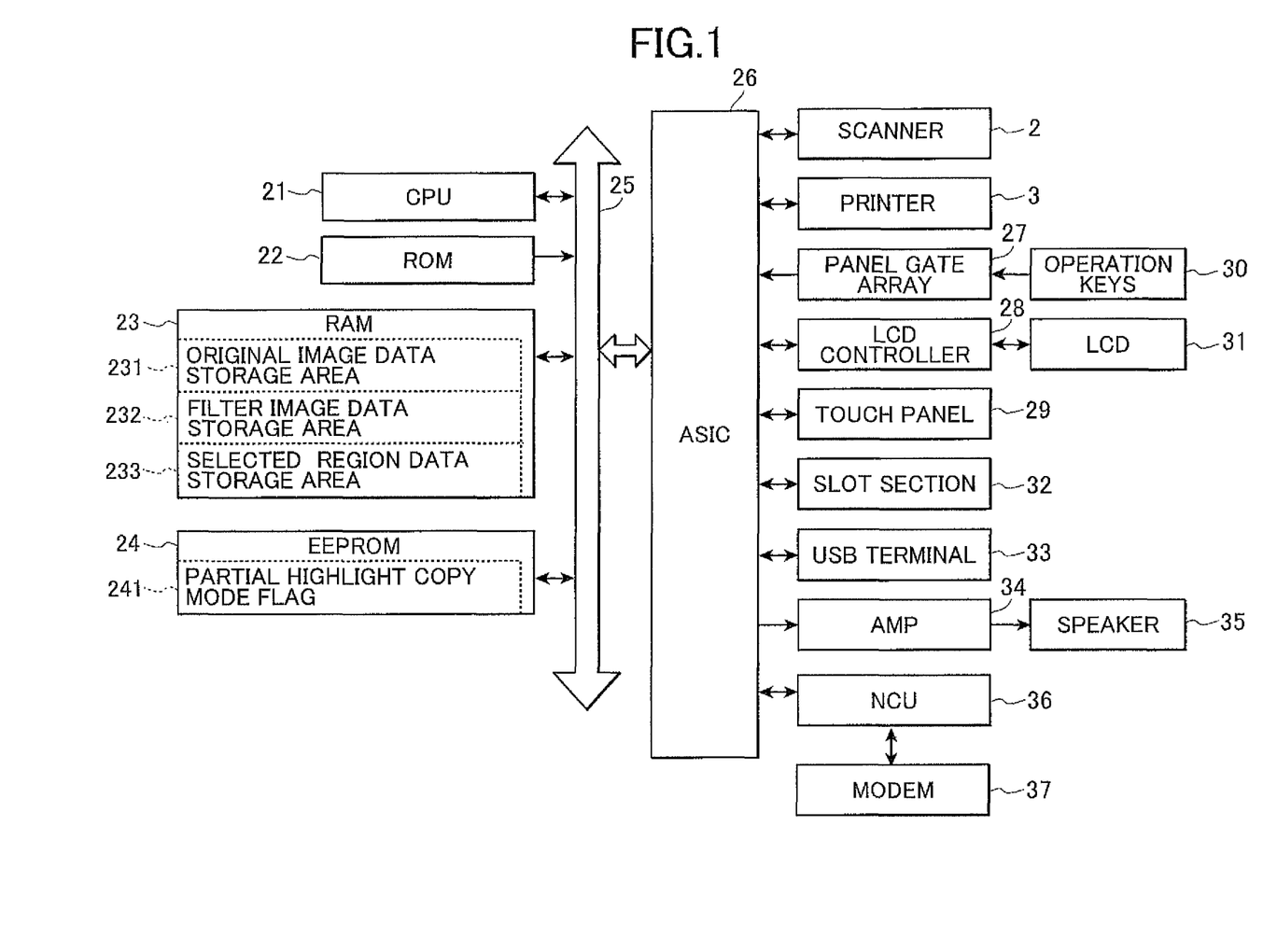
FIG. 1 is a block diagram showing the electrical structure of an image forming device according to an embodiment of the present invention.

An image forming device according to an embodiment of the invention will be described while referring to the accompanying drawings wherein like parts and components are designated by the same reference numerals to avoid duplicating description. As shown in FIG. 1, a multifunction device 1 is integrally configured of a scanner 2, a printer 3, a bus 25, an application specific integrated circuit (ASIC) 26, a panel gate array 27, a LCD controller 28, a touch panel 29, operation keys 30, a liquid crystal display (LCD) 31, a slot section 32, an USB terminal 33, an amp 34, a speaker 35, a network control unit (NCU) 36, a modem 37, and a microcomputer. The microcomputer primarily includes a central processing unit (CPU) 21, a read-only memory (ROM) 22, a random access memory (RAM) 23, and an electrically erasable programmable ROM (EEPROM) 24.

The CPU 21 performs overall control of the multifunction device 1 based on programs stored in the ROM 22. The ROM 22 stores programs for controlling various operations of the multifunction device 1, including program for implementing a partial enhancement copy process shown in the flowcharts of FIGS. 4 and 5.

The RAM 23 is used as a storage area for temporarily storing various data used when the CPU 21 executes the above programs and as a work area for the CPU 21. The RAM 23 includes an original image data storage area 231, a filter image data storage area 232, and a selected region data storage area 233. The scanner 2 converts lights reflected from an original image into electrical signals, and generates and outputs an original image data. The original image data includes digital signals each representing luminance values for each of red (R), green (G), and blue (B) colors.

The original image data storage area 231 functions to store the original image data outputted by the scanner 2. The filter image data storage area 232 functions to store filter image data. The filter image data is data used to display a filter image 52 described later (see FIG. 3) in a display region 50 of the LCD 31. The filter image data combines an alpha value expressing the degree of transparency (A) with luminance values for each of the red (R), green (G), and blue (B) colors. The selected region storage area 233 functions to store position data indicating selected regions 58 (see FIG. 2) set according to user-specified positions. The filter image 52 and the selected region 58 will be described later with reference to FIG. 2.

The EEPROM 24 is a writable nonvolatile memory and includes a partial highlight copy mode flag 241. A value stored in the partial enhancement copy mode flag 241 indicates whether a partial enhancement copy mode is set to on or off. The user can freely turn the partial enhancement copy mode on and off. When the partial enhancement copy mode is off, the multifunction peripheral 1 directs the printer 3 to form a normal copy image in which the color tone levels of the original image are reproduced. However, when the partial highlight copy mode is on, the multifunction peripheral 1 prompts the user to select a region or regions of the original image to highlight and subsequently controls the printer 3 to form a copy image in which the user-selected regions are highlighted or enhancement. This process will be described later in greater detail with reference to FIGS. 2 and 3.

The ASIC 26 controls operations of each component connected to the ASIC 26 based on commands received from the CPU 21. The scanner 2, printer 3, and slot section 32 have structures that are well known in the art and, hence, a description of these structures will not be given herein. The panel gate array 27 connects the operating keys 30 to the ASIC 26 and functions to detect when one of the operating keys 30 is pressed and to output to the ASIC 26 an encoded signal assigned to the pressed key. When a prescribed encoded signal is received from the panel gate array 27, the CPU 21 references a key process table and executes the control process associated with the encoded signal.

The ASIC 26 is connected to the USB terminal 33 that functions to transmit to and receive from an external device such as a computer and a digital camera via a USB cable (not shown). The ASIC 26 is also connected to the amp 34 that functions to control the speaker 35 to output various sounds. For example, the speaker 35 is capable of output ringing tone, beep tone, some messages, and the like. The ASIC 26 is also connected to the NCU 36 and the modem 37. Further, the ASIC 26 may be connected to a network interface (not shown) that functions to transmit/receive data to/from computers provided on a network.

The LCD controller 28 is connected to the ASIC 26 and the LCD 31. Based on instructions from the CPU 21, the LCD controller 28 functions to display, on the LCD 31, various information about operations of the printer 3 and the scanner 2, or an original image 52 read by the scanner 2 (see FIG. 3).

Figure 2:
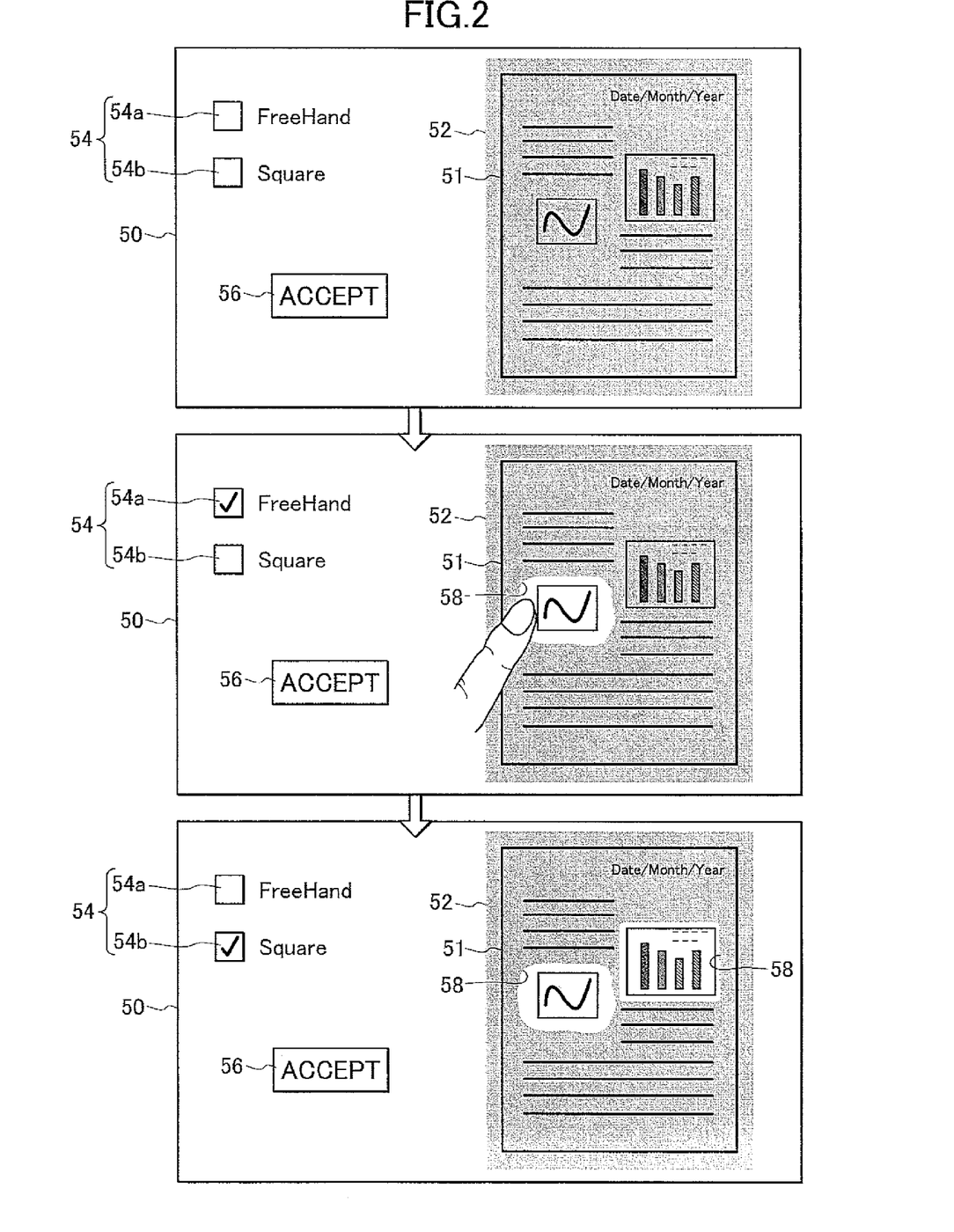
FIG. 2 is an explanatory diagram illustrating operations of a user of the image forming device and display images that are displayed on a display unit of the image forming device.

The touch panel 29 is connected to the ASIC 26 and is superposed on the display region 50 of the LCD 31 (see FIG. 2). The touch panel 29 has an area disposed to parallel to the display region 50 of the LCD 31 and corresponding to the display region 50. The area is transparent so that the display region 50 of LCD 31 is visible when the user sees the display region 50 from above the touch panel 29. The touch panel 29 enables the user to specify a prescribed position on the touch panel 29. When the user touches the touch panel 29, the CPU 21 detects a prescribed position touched by the user's finger and generates position data corresponding to the position.

Next, operations of the multifunction peripheral 1 when the partial highlight copy mode is on will be described with reference to FIG. 2. The CPU 21 controls the LCD controller 28 to display, in the display region 50 of the LCD 31, an original display image 51 based on original image data that is acquired by scanning an original image with the scanner 2. Thus, the user can view the original display image 51 displayed in the display region 50 and select parts that the user wishes to highlight within the original image. In order to clearly differentiate between parts of the original image that the user has selected and unselected parts of the original image, the CPU 21 controls the LCD controller 28 to initially superimpose a rectangular filter image 52 of a prescribed color on the entire original display image 51 displayed in the display region 50. As shown in FIG. 2, the filter image 52 is displayed with transparency so that the original display image 51 displayed behind the filter image 52 is visible. More specifically, the filter image 52 can be displayed according to alpha blending or another technique known in the art that produces a transparency effect when rendering an object.

When the user indicates a position within the original display image 51 by touching the touch panel 29 at a position corresponding to the desired position in the original display image 51, the CPU 21 erases the part of the filter image 52 corresponding to a selected region 58 that includes the user-specified position. Consequently, the user can now see the portion of the original display image 51 within the selected region 58 more clearly than the remainder of the original image 51 since the part of the filter image 52 within the selected region 58 has been removed and the remainder of the original display image 51 is viewed through the filter image 52. In other words, the original display image 51 viewed through the remaining portion of the filter image 52 is slightly more difficult to see. This image displayed in the display region 50 gives the user an idea of what the printed image will look like after highlighting the selected regions 58, thereby facilitating the user in selecting desired regions to highlight or enhance. Therefore, the original display image 51 includes the selected region 58 and a non-selected region that is outside of the selected region 58.

In addition to the original display image 51 and filter image 52, highlighting method selection buttons 54 and an Accept button 56 are displayed in the display region 50. The highlighting method selection buttons 54 allow the user to select the method for indicating and erasing portions of the filter image 52. Specifically, the highlighting method selection buttons 54 include a Freehand button 54a enabling the user to trace an area to be erased (highlighted) in freehand, and a Square button 54b for indicating a rectangular region to be erased. If the user selects the Freehand button 54a simply by touching the touch panel 29 at a position corresponding to the Freehand button 54a and subsequently traces a region in the original display image 51, the CPU 21 determines a selected region 58 based on the traced path and removes the portion of the filter image 52 within the selected region 58. The selected region 58 is determined by setting a width of a line indicated by the traced path to a prescribed width. In other words, the CPU 21 determines, as the selected region, a region defined by the path and an surrounding area from the path. However, if the user has selected the Square button 54b and subsequently indicates two points within the original image 51, the CPU 21 sets a rectangular region formed by setting the specified two points as diagonal vertices of a rectangle as the selected region 58 and removes the portion of the filter image 52 within the selected region 58.

If the user subsequently presses the Accept button 56, the CPU 21 fixes or finalizes the selected regions 58 that have been specified thus far. Subsequently, the CPU 21 controls the printer 3 to form a copy image in which the portions displayed within the selected regions 58 are highlighted (a partially enhancement copy image).

Next, the differences between a normal copy image and the partially highlighted copy image formed by the printer 3 on a recording paper will be described with reference to FIG. 3.

Figure 3:
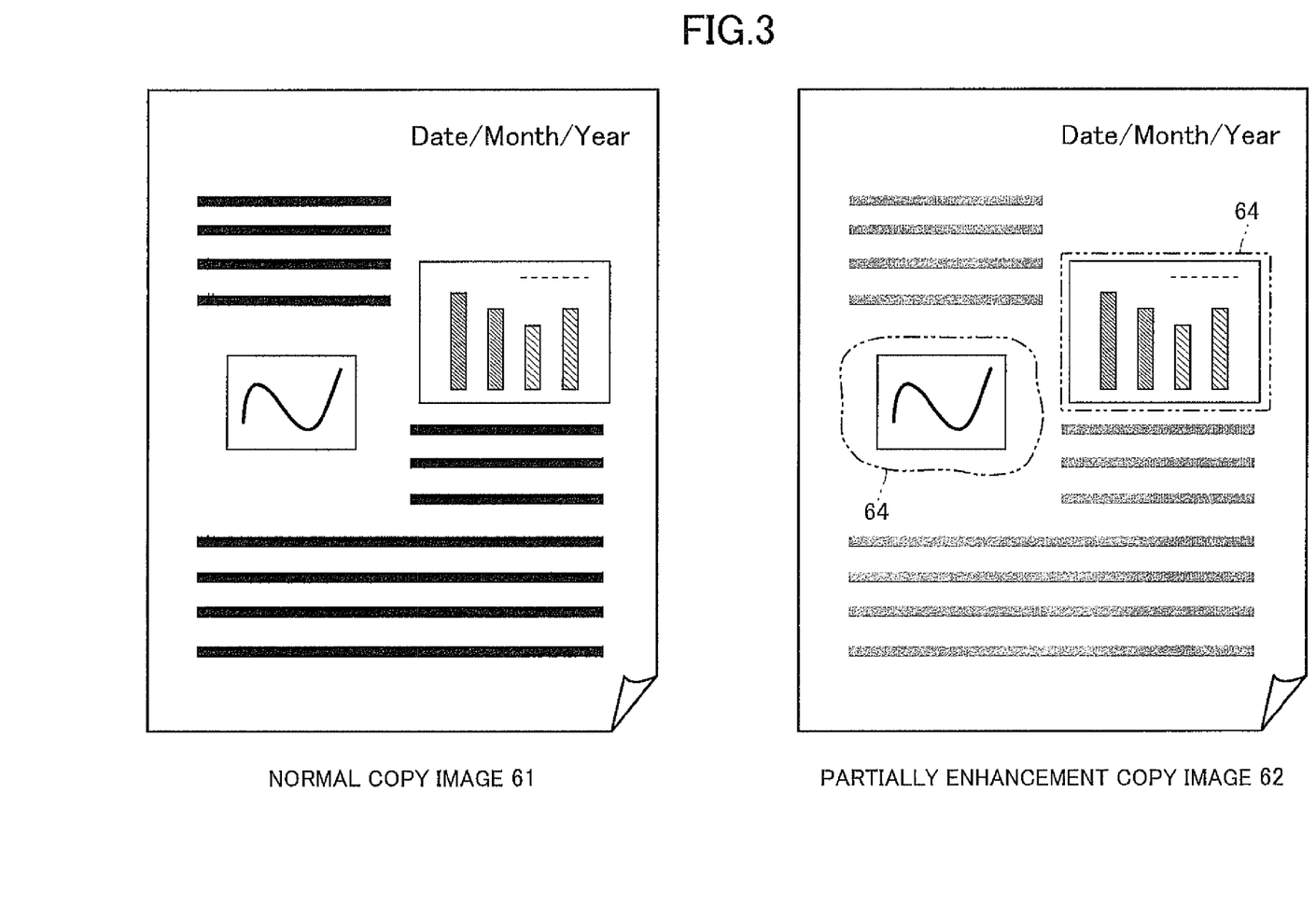
FIG. 3 is an explanatory diagram showing a normal copy image and a partially enhancement copy image that are formed by the image forming device.

A normal copy image 61 shown in FIG. 3 is a copy of the original image, i.e., an image reproducing the tone levels of an original image scanned by the scanner 2. Here, an "image reproducing the tone levels of the original image" is not restricted to cases in which the tone levels are perfectly reproduced, but also includes cases in which the tone levels of the original image have been reproduced sufficiently for the copy image to appear identical to the original image at a glance.

A partially enhancement copy image 62 is also a reproduction of an original image scanned by the scanner 2. However, in this case, parts of the original display image 51 displayed within the selected regions 58 selected in the display region 50 (see FIG. 2) have been highlighted as a part 64 in the partially enhancement copy image 62. More accurately, parts of the original display image 51 displayed outside of the selected regions 58 are formed lighter (i.e., with less density) in the partially enhancement copy image 62 than that of the normal copy image 61. Consequently, the parts 64 formed with the same density as the normal copy image 61 (i.e., reproducing the tone levels of the original image) stand out among the other lighter regions in the partially enhancement copy image 62 so as to appear highlighted.

With the multifunction peripheral 1 according to the embodiment, a user can view the original display image 51 displayed in the display region 50 and, through simple operations in the display region 50, can specify selected regions 58 within the original display image 51 that the user wishes to highlight. Accordingly, the user can obtain the partially enhancement copy image 62, which is a copy of the original image 51 in which useful parts of the image selected by the user have been highlighted or enhanced. Enhancement parts specified by the user can be very useful for another person referencing the document since the person can quickly discern important parts of the original image. Further, since the partially enhancement copy image 62 is formed lighter as a whole, less ink, toner, or other coloring agent is required to form the partially enhancement copy image 62 than to form the normal copy image 61.

Figure 4:
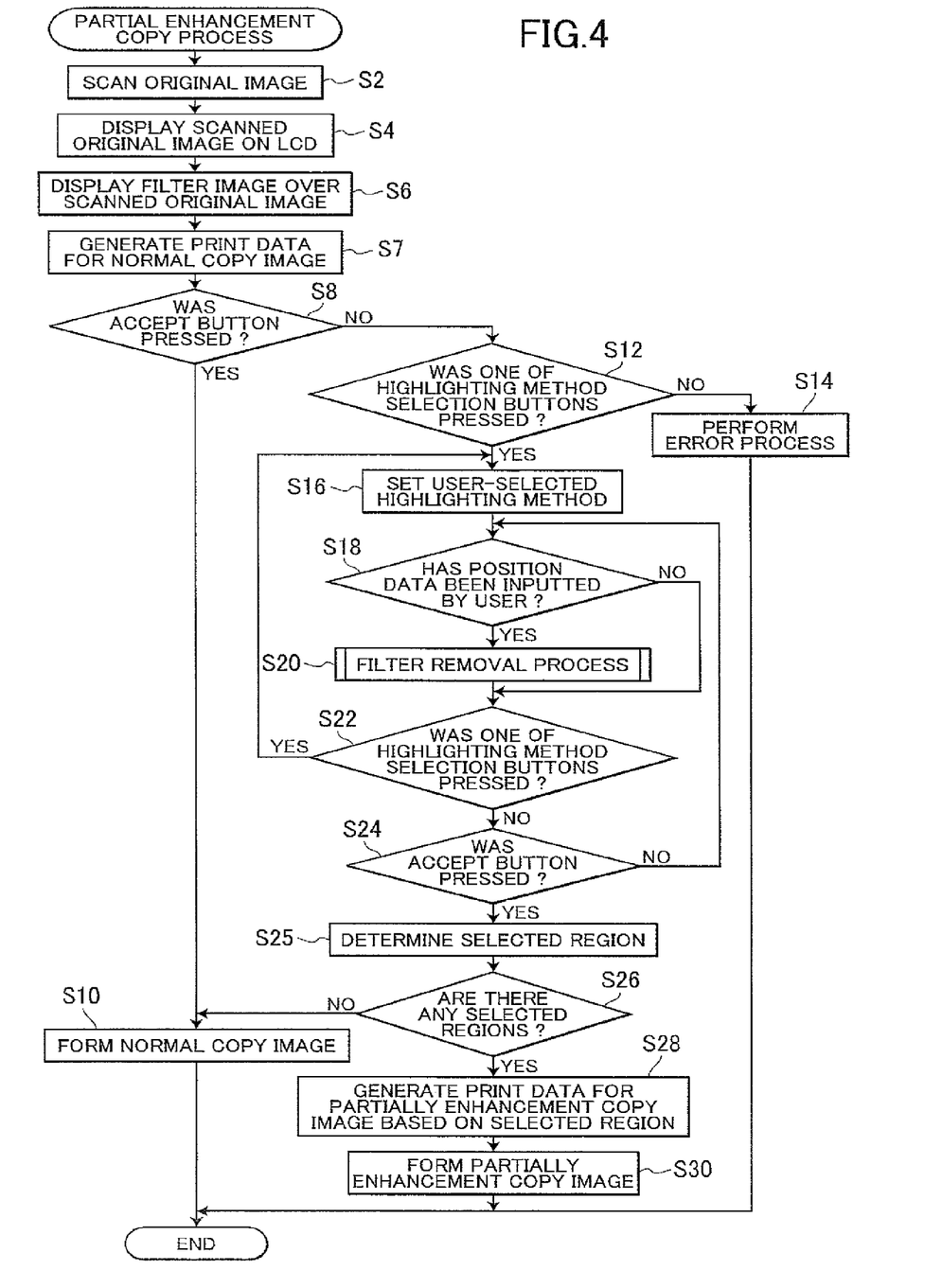
FIG. 4 is a flowchart illustrating steps in a partial enhancement copy process performed on the image forming device.

FIG. 4 illustrates steps in a partial enhancement copy process. The CPU 21 executes the partial enhancement copy process when a copy command is received, and the partial enhancement copy mode flag 241 (see FIG. 1) is on. For example, the CPU 21 receives the copy command when the user specified a copy mode by touching a prescribed portion of the touch panel 29 or by pressing a copy button (not shown).

In S2 at the beginning of the partial enhancement copy process shown in FIG. 4, the CPU 21 controls the scanner 2 to scan an original image from a document placed on a scanning bed (not shown) of the scanner 2. Subsequently, the CPU 21 stores, in the original image data storage area 231, original image data corresponding to the scanned original image. In S4 the CPU 21 controls to the LCD controller 28 to display the original display image in the display region 50 of the LCD 31 based on the original image data. In S6 the CPU 21 controls to the LCD controller 28 to display the filter image 52 over the original display image 51 in the display region 50 as shown in FIG. 2.

In S7 the CPU 21 executes a process well known in the art for generating print data based on data for the original image data stored in the original image data storage area 231. Here, the process to generate print data is a color conversion process and the like for converting values in the RGB color space to values in the CMYK color space, for example. When this print data is outputted to the printer 3, the printer 3 can be controlled to print the normal copy image 61 (see FIG. 3), reproducing the color tones in the original image.

In S8 the CPU 21 determines whether or not the Accept button 56 was pressed (see FIG. 2). If the Accept button 56 was pressed (S8: YES), in S10 the CPU 21 controls the printer 3 to form the normal copy image 61 as a reproduction of the original image based on the original image data. In other words, the printer 3 forms the normal copy image 61 when the user presses the Accept button 56 while no selected regions 58 are present in the display region 50. For example, if the user is considering selecting parts of the original display image 51 to highlight while viewing the original display image 51 displayed in the display region 50 but ultimately presses the Accept button 56 without selecting any regions to highlight, the CPU 21 controls the printer 3 to form the normal copy image 61 in which the color tones of the original image are reproduced, rather than forming a copy image that is lighter as a whole. Hence, the multifunction peripheral 1 can form an image according to the user's wishes.

On the other hand, if the CPU 21 determines in S8 that the Accept button 56 was not pressed (S8: NO), in S12 the CPU 21 determines whether or not one of the highlighting method selection buttons 54 was pressed. If one of the highlighting method selection buttons 54 is not pressed over a continuous prescribed time (S12: NO), in S14 the CPU 21 performs an error process and subsequently ends the partial enhancement copy process. However, if one of the highlighting method selection buttons 54 was pressed (S12: YES), in S16 the CPU 21 sets the user-selected highlighting method. In S18 the CPU 21 determines whether or not the position data for positions in the display region 50 specified by the user is inputted. Specifically, the position data is generated by the CPU 21 when the CPU 21 detects a prescribed position of the touch panel 29 touched by the user. If the user has inputted position data (S18: YES), in S20 the CPU 21 executes a filter removal process for setting the selected region 58 and removing the portion of the filter image 52 within the selected region 58.

Figure 5:
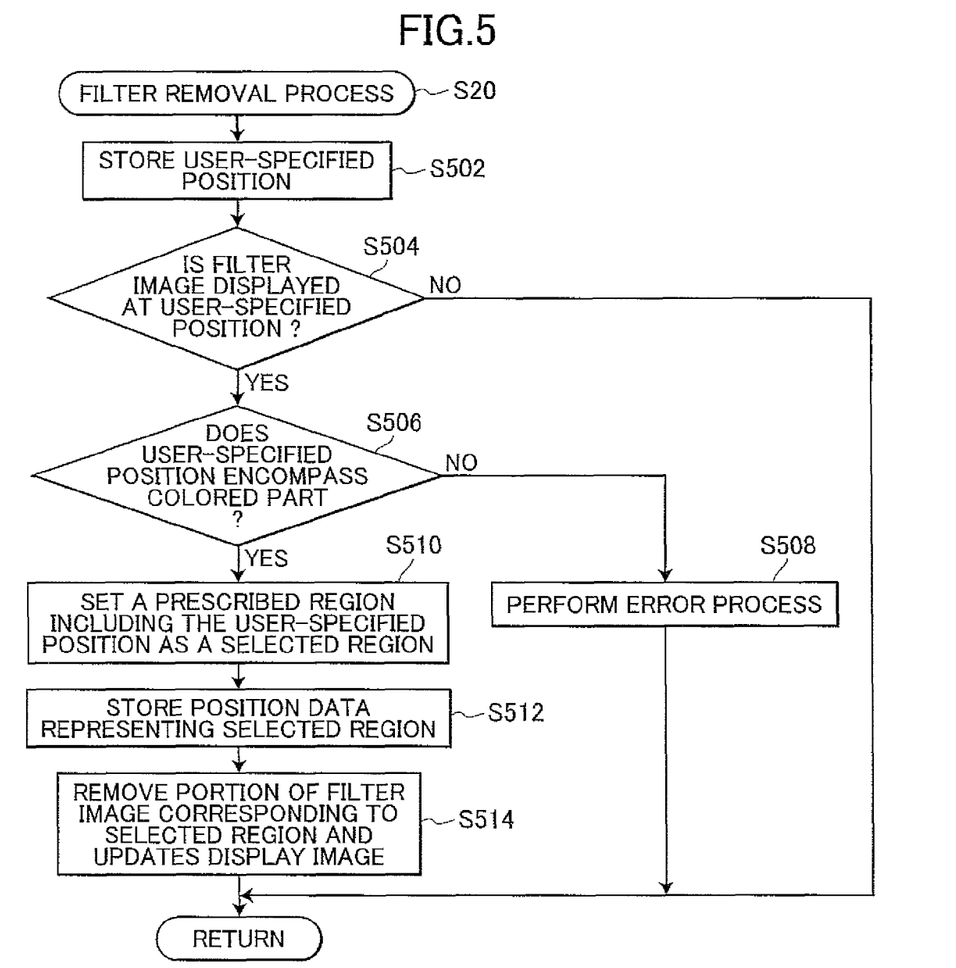
FIG. 5 is a flowchart illustrating a part of steps in a filter removal process executed during the partial enhancement copy process of FIG. 4.

The CPU 21 executes the filter removal process shown in FIG. 5 when the user specifies positions in the display region 50 while the original display image 51 is displayed therein and corresponding position data is inputted via the touch panel 29.

In S502 at the beginning of the filter removal process in FIG. 5, the CPU 21 stores the user-specified positions, and more accurately the position data inputted via the touch panel 29. In S504 the CPU 21 determines whether or not the filter image 52 is displayed at the user-specified positions. If the filter image 52 is not displayed at the user-specified positions (S504: NO), the CPU 21 ends the filter removal process and returns to S22 of FIG. 4.

However, if the filter image 52 is displayed at the user-specified position (S504: YES), in S506 the CPU 21 determines whether or not a user-specified region encompasses a colored part of the original image 51. The "user-specified region" is specifically a region defined by a path and a surrounding area within a prescribed range from the path when the user has selected "freehand" as the highlighting method. The path is traced by the user in the display region 50. Further, the "user-specified region" is a rectangular region formed by setting two user-specified points in the display region 50 as diagonal vertices of the rectangle when the user has selected "square" as the highlighting method. The colored part is a portion of the original display image 51 that is not blank, i.e., a portion of the original display image 51 containing text, part of an image, a background color, or the like. If the user-specified region does not encompass a colored part (S506: NO), in S508 the CPU 21 executes an error process and subsequently returns to S22 of FIG. 4.

However, if the user-specified region encompasses a colored part (S506: YES), in S510 the CPU 21 sets the user-specified region including the user-specified positions as the selected region 58. In this way, the multifunction peripheral 1 can set suitable selected regions 58 that include colored parts of the original image.

In S512 the CPU 21 stores the position data representing the selected region 58 set in S510 in the selected region storage area 233 (see FIG. 1). In S514 the CPU 21 removes only the portion of the filter image 52 corresponding to the selected region 58, updates the display in the display region 50, and subsequently returns to S22 of FIG. 4. In other words, in S514 the CPU 21 displays, in the display region 50, the original display image 51 and the filter image 52 whose part corresponding to the selected region 58 is removed.

After returning to FIG. 4, in S22 the CPU 21 determines whether or not one of the highlighting method selection buttons 54 was pressed. If one of the highlighting method selection buttons 54 was pressed (S22: YES), the CPU 21 returns to S16 and repeats the process described above. However, if one of the highlighting method selection buttons 54 was not pressed (S22: NO), in S24 the CPU 21 determines whether or not the Accept button 56 was pressed. If the Accept button 56 was not pressed (S24: NO), the CPU 21 returns to S18 and repeats the above process. However, if the Accept button 56 was pressed (S24: YES), in S25 the CPU 21 fixes the selected regions 58 selected thus far.

In S26 the CPU 21 determines whether or not there is the selected region 58. If there is no selected region (S26: NO), the CPU 21 performs the normal mode copy process in S10. However, if there is at least one selected region 58 (S26: YES), in S28 the CPU 21 generates partially highlighted data for forming the partially enhancement copy image 62 with the printer 3 based on the selected regions 58 fixed in S25. More specifically, the CPU 21 converts the position data stored in the selected region data storage area 233 (see FIG. 1) to position data indicating positions in the original image, identifies parts of the original display image 51 displayed within the selected regions 58, calibrates the original image data so that pixels constituting the identified parts are made lighter, and generates highlighted data to be printed based on the calibrated original image data. Alternatively, the CPU 21 may generate highlighted data by calibrating the print data generated in S7 to reduce the density in parts of to-be-formed image corresponding to the selected regions 58. Since the highlighted data is generated based on the selected regions 58 after all selected regions 58 have been finalized, the partial highlighted copy process generates highlighted data more efficiently than when highlighted data is regenerated each time a selected region 58 is set. Then, in S30 the CPU 21 outputs the highlighted data generated in S28 to the printer 3 and controls the printer 3 to form the partially enhancement copy image 62.

With the partial enhancement copy process according to the embodiment, the printer 3 can form the partially enhancement copy image 62 in which the user-selected regions of the original display image 51 to be highlighted is selected by the user when the original display image 51 was displayed in the display region 50.

While the invention has been described in detail with reference to the embodiment thereof, it would be apparent to those skilled in the art that various changes and modifications may be made therein without departing from the spirit of the invention.

For example, while the multifunction peripheral 1 according to the above-described embodiment stores position data representing the positions of selected regions 58, the multifunction peripheral 1 may instead generate mask data representing regions in which the filter image 52 exists and does not exist, enlarge the mask data to the same size as the original image, superimpose the enlarged mask data over the original image data or print data, and calibrate this original image data or print data so that regions in which the filter image 52 exists are formed at a lighter density.

Further, the multifunction peripheral 1 according to the above-described embodiment differentiates the selected regions 58 from other regions in the display original image 51 on the LCD 31 by first superimposing the filter image 52 over the original display image 51 and then erasing portions of the filter image 52 within the selected regions 58. However, the selected regions 58 may instead be enclosed with curved or straight lines.

In the above-described embodiment, the CPU 21 controls the printer 2 to form the partially enhancement copy image 62 whose portions corresponding to the selected regions 58 are highlighted by forming portions corresponding to the parts displayed outside the selected regions 58 lighter than the normal copy image 61 (see FIG. 3), but there are many possible variations of the method for partially highlighting an image. For example, the multifunction peripheral 1 may fowl portions of a partially enhancement copy image corresponding to a part of the original display image 51 displayed within the selected regions 58 lighter than the normal copy image 61, while portions of the partial enhancement copy image corresponding to parts of the original display image 51 outside the selected regions 58 are formed at normal density. Alternatively, the multifunction peripheral 1 may form portions of a partially enhancement copy image corresponding to the selected regions 58 as color images and the remaining portions of the partial highlighted copy image as monochrome images.

Further, the original image data may be received by using facsimile function or be read from a memory card inserted into the slot section 32 (see FIG. 1).

Further, in the above-described embodiment, the CPU 21 detects a prescribed position touched by the user and generates position data. However, a touch panel controller (not shown) may detect a prescribed position touched by the user and generate the position data, and then the touch panel controller may transmit the position data to the CPU 21. Further, the touch panel controller described above may be provided on the ASIC 26.

What is claimed is:

1. An image forming device comprising:
a display unit that includes a display region;
an original image display unit that displays an original display image in the display region based on original image data;
a touch panel that is superposed on the display region, the touch panel enabling a user of the image forming device to specify a prescribed position on the touch panel;
a detecting unit that detects a prescribed position touched by the user and generates position data based on the prescribed position;
a selected region determining unit that determines, based on the position data, a selected region in the original display image when the original image display unit displays the original display image in the display region, the original display image including the selected region and a non-selected region outside of the selected region in the original display image;
a selected region display unit that displays a partially enhancement display image in the display region when the selected region determining unit determines the selected region, the partially enhancement display image including an enhancement region and a non-enhancement region, the enhancement region corresponding to the selected region, the non-enhancement region corresponding to the non-selected region, the selected region display unit comprising:
a filter image superimposing unit that superimposes a filter image on the original display image to display the partially enhancement display image when the original image display unit displays the original display image, the filter image having a colored transparency, thereby making the original display image behind the filter image visible, the partially enhancement display image being visually partitioned into the enhancement region and the non-enhancement region by the filter image; and
a filter image erasing unit that erases a part of the filter image corresponding to the selected region, the enhancement region corresponding to the part, the non-enhancement region corresponding to a remaining part of the filter image,
an image forming unit that forms an image on a recording medium; and
a control unit that controls the image forming unit to form a partially enhancement image on the recording medium based on the original image data and the partially enhancement display image, the partially enhancement image including an enhancement part and a non-enhancement part, the enhancement part corresponding to the enhancement region, the non-enhancement part corresponding to the non-enhancement region, the control unit controlling the image forming unit to form the partially enhancement image by changing a parameter of at least one of the enhancement part and the non-enhancement part from a corresponding part of the original image data, the partially enhancement image excluding the filter image.

2. The image forming device according to claim 1, wherein the control unit includes:
a first control unit that controls the image forming unit to form a normal image based on the original image data, the normal image having same tone levels as the original image; and
a second control unit that controls the image forming unit to form the partially enhancement image on the recording medium, the non-enhancement part having tone levels lower than tone levels of the enhancement part.

3. The image forming device according to claim 2, wherein the first control unit controls the image forming unit to form the normal image unless the selected region determining unit determines the selected region.

4. The image forming device according to claim 1, further comprising:
a user-specified region specifying unit that specifies, based on the position data, a user-specified region in the original display image; and
a fixing unit that enables the user to fix the user-specified region, and
wherein the selected region determining unit determines the user-specified region as the selected region when the user-specified region is fixed by the user via the fixing unit.

5. The image forming device according to claim 1, further comprising:
a user-specified region specifying unit that specifies, based on the position data, a user-specified region in the original display image; and
a colored part determining unit that determines whether or not the user-specified region encompasses a colored part, and
wherein the selected region determining unit determines the user-specified region as the selected region and the selected region displaying unit displays the user-specified region as the enhancement region, when the colored part determining unit determines that the user-specified region encompasses a colored part, and wherein the selected region determining unit determines the user-specified region as the non-selected region and the selected region display unit displays the user-specified region as the non-enhancement region when the colored part determining unit determines that the user-specified region fails to encompass the colored part.

6. The image forming device according to claim 5, wherein the colored part is different from a blank part.

7. The image forming device according to claim 1, further comprising a scanning unit that scans an original image and generates the original image data.

8. The image forming device according to claim 1, wherein the touch panel enables the user to trace a path;
wherein the detecting unit detects the path and generates the position data based on the path; and
wherein the selected region determining unit determines, as the selected region, a region defined by the path and a surrounding area from the path.

9. The image forming device according to claim 1, wherein the touch panel enables the user to specify two points;
wherein the detecting unit detects the two points and generates the position data; and
wherein the selected region determining unit determines, as the selected region, a rectangular region formed by setting the two points as diagonal vertices of a rectangle.

10. The image forming device according to claim 1, wherein the enhancement part is formed at same density as a corresponding part of the original image, and the non-enhancement part is formed with lower density than a corresponding part of the original image.

11. A method executed by an image forming device, the method comprising:
displaying an original display image in a display region based on original image data;
enabling a user of the image forming device to specify a prescribed position on a touch panel;

detecting a prescribed position touched by the user;
generating position data based on the prescribed position;
determining, based on the position data, a selected region in the original display image, the original display image including the selected region and a non-selected region outside of the selected region in the original display image;
displaying a partially enhancement display image in the display region by superimposing a filter image on the original display image to display the partially enhancement display image;
erasing a part of the filter image corresponding to the selected region, the partially enhancement display including an enhancement region and a non-enhancement region, the enhancement region corresponding to the part, the non-enhancement region corresponding to a remaining part of the filter image and corresponding to the non-selected region, the filter image having a colored transparency, thereby making the original display image behind the filter image visible, the partially enhancement display image being visually partitioned into the enhancement region and the non-enhancement region by the filter image; and
controlling an image forming unit to form a partially enhancement image on a recording medium based on the original image data and the partially enhancement display image, the partially enhancement image including an enhancement part and a non-enhancement part, the enhancement part corresponding to the enhancement region, the non-enhancement part corresponding to the non-enhancement region the partially enhancement image being formed by changing a parameter of at least one of the enhancement part and the non-enhancement part from a corresponding part of the original image data, the partially enhancement image excluding the filter image.

12. A non-transitory computer-readable recording medium that stores an image forming program, the image forming program comprising instructions for:
displaying an original display image in a display region based on original image data;
enabling a user to specify a prescribed position on a touch panel;
detecting a prescribed position touched by the user;
generating position data based on the prescribed position;
determining, based on the position data, a selected region in the original display image the original display image including the selected region and a non-selected region outside of the selected region in the original display image,
displaying a partially enhancement display image in the display region by superimposing a filter image on the original display image to display the partially enhancement display image;
erasing a part of the filter image corresponding to the selected region, the partially enhancement display including an enhancement region and a non-enhancement region, the enhancement region corresponding to the part, the non-enhancement region corresponding to a remaining part of the filter image and corresponding to the non-selected region, the filter image having a colored transparency, thereby making the original display image behind the filter image visible, the partially enhancement display image being visually partitioned into the enhancement region and the non-enhancement region by the filter image; and
controlling an image forming unit to form a partially enhancement image on a recording medium based on the original image data and the partially enhancement display image, the partially enhancement image including an enhancement part and a non-enhancement part, the enhancement part corresponding to the enhancement region, the non-enhancement part corresponding to the non-enhancement region the partially enhancement image being formed by changing a parameter of at least one of the enhancement part and the non-enhancement part from a corresponding part of the original image data, the partially enhancement image excluding the filter image.

13. The image forming device according to claim 1, further comprising:
a user-specified region specifying unit that specifies, based on the position data, a user-specified region in the original display image; and
a colored part determining unit that determines whether or not the user-specified region encompasses a colored part, and
wherein the filter image erasing unit erases a part of the filter image corresponding to the user-specified region when the color part determining unit determines that the user-specified region encompasses the colored part, and
wherein the filter image erasing unit does not erase the part of the filter image corresponding to the user-specified region when the color part determining unit determines that the user-specified region does not encompass the colored part.

* * * * *